Oct. 18, 1960
G. W. SHARRAR
2,957,040
OUTDOOR CORNER LAMP BRACKETS
Filed Sept. 17, 1958
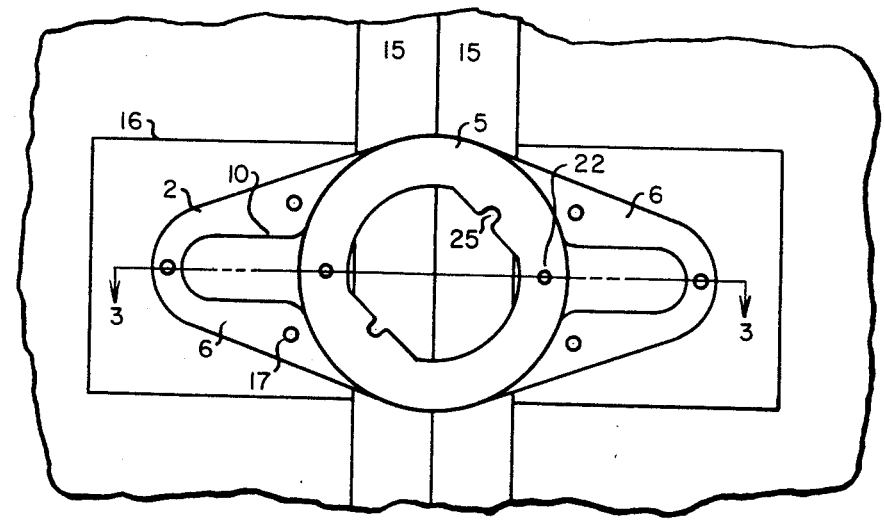
Fig. 2
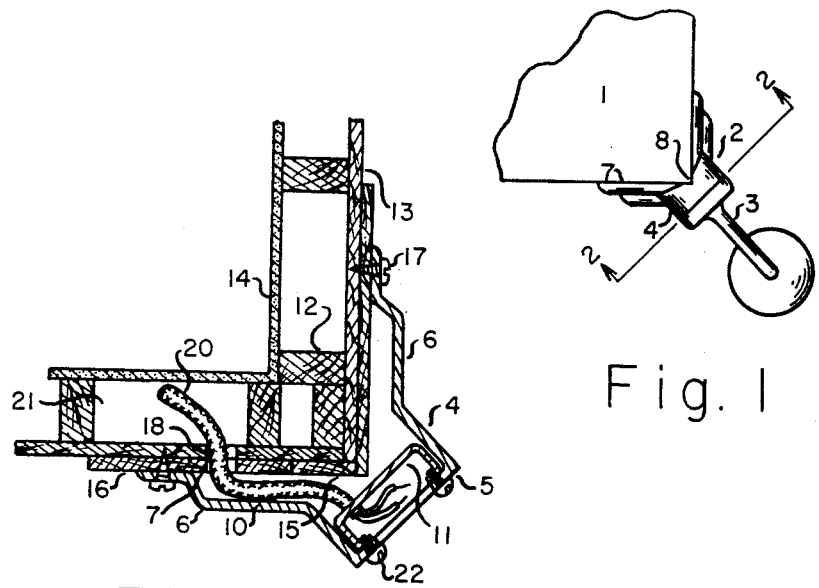
Fig. 3
Fig. 1
INVENTOR.
GEORGE W. SHARRAR
BY
Bruno C. Lechler
Attorney United States Patent Office 2,957,040
Patented Oct. 18, 1960

2,957,040
OUTDOOR CORNER LAMP BRACKETS

George W. Sharrar, 1729 14th Ave., Moline, Ill.

Filed Sept. 17, 1958, Ser. No. 761,643

3 Claims. (Cl. 174—48)

The invention relates to a lamp bracket adapted to be fastened to the corner of an existing building to support a lamp arm that extends in a diagonal direction and which supports a single lamp in a position to light two sides of the building. By way of illustration, if placed on the front corner of a house, it may light the path from the garage along the side of the house to the front of the house and also the path from the corner of the house to the front door.

Where a lamp bracket is attached to the corner of an existing house an unsightly outlet box must usually be placed on the wall with conspicuous conduits or wires.

The invention permits mounting such a lamp bracket on the side of the house without visible conduits or outlet boxes.

Figure 1 shows in plan the corner of a building to which the invention has been attached to support a lamp.

Figure 2 is an elevation taken along lines 2—2 in Figure 1 and drawn to a larger scale of the invention.

Figure 3 is a horizontal section taken along lines 3—3 in Figure 2 showing the construction of the bracket and its relation to the wall of a typical house drawn to an intermediate scale.

In the drawings, 1 represents a typical house, 2 the bracket that is the subject of the invention, 3 a lamp arm supported on the bracket.

The bracket consists of a cylindrical body 4 which has an inwardly extending flange 5 and two wings 6 that are an integral part of the cylindrical body. Each wing 6 has a face 7 and these faces, which are at right angle to each other, meet in line 8 that passes through the axis of the cylindrical portion 4. Each wing has a raised rib 10 that extends out from the cylindrical portion 4. While this rib serves to stiffen the wing, its more important function is to provide a passage for wires or cables not visible from without. The cylindrical portion carries an outlet box 11 that may be attached to flange 5.

As will be seen in Figure 3, the house will usually have studding 12 to which siding 13 is attached and which supports the inner wall 14. It is customary to place vertical strip 15 on the corners of the siding. A board 16 of the same thickness as strip 15 is attached to the siding. The bracket 2 is attached to these boards 16 by screws or nails 17. Before attaching the bracket to the building a hole 18 is drilled through the siding 13 and board. A conduit 20 starting from the wall space 21 passes through hole 18 and along inside of rib 10 to the portion 4 of the bracket and enters outlet box 11. The flange 5 has threaded holes 22 to which the lamp may be bolted.

In this manner the bracket can be mounted to project diagonally out from the corner of any building without showing either cables or outlet boxes.

I claim:

1. An exterior wall bracket comprising, in combination, an outlet box, a cylindrical hollow body encasing said outlet box, an inwardly extending flange on one end of said hollow body, openings in said flange permitting the flange to be attached to said outlet box, two outwardly extending flat wings on said body normal to each other and intersecting in a line normal to the axis of said hollow body, means to attach said flat wings at the corner of a house to the two sides of the house.

2. In an exterior wall bracket of the type described in claim 1, additional openings in said flange, a lamp bracket abutting said flange, means to attach the lamp bracket to said flange.

3. In an exterior wall bracket of the type described in claim 1, recesses in the wings permitting a cable coming out of the side of the house to pass on the underside of said wing to said outlet box.

References Cited in the file of this patent

UNITED STATES PATENTS

| | | |
|---|---|---|
| 1,866,954 | Svetcoff | July 12, 1932 |
| 2,640,670 | Lampe | June 2, 1953 |